US010062081B2

United States Patent
(12) United States Patent
Charters et al.

(10) Patent No.: US 10,062,081 B2
(45) Date of Patent: Aug. 28, 2018

(54) PROVIDING REAL WORLD CONTEXTS TO COMPUTER APPLICATIONS

(75) Inventors: Graham C. Charters, Southhampton (GB); Amanda E. Chessell, Alton (GB); Michael Friess, Baden-Wurthenberg (DE); Vernon M. Green, Newbury (GB); Keith B. Mantell, Winchester (GB)

(73) Assignee: International Business Machines Corporation, Armonk, NY (US)

(*) Notice: Subject to any disclaimer, the term of this patent is extended or adjusted under 35 U.S.C. 154(b) by 2966 days.

(21) Appl. No.: 10/907,034

(22) Filed: Mar. 17, 2005

(65) Prior Publication Data

US 2005/0209935 A1 Sep. 22, 2005

(30) Foreign Application Priority Data

Mar. 19, 2004 (GB) .................................. 0406162.8

(51) Int. Cl.

| | |
|---|---|
| ***G06F 3/00*** | (2006.01) |
| ***G06F 9/44*** | (2018.01) |
| ***G06F 9/46*** | (2006.01) |
| ***G06F 13/00*** | (2006.01) |
| ***G06Q 30/02*** | (2012.01) |
| ***G06Q 10/08*** | (2012.01) |
| ***G06Q 20/20*** | (2012.01) |
| ***G06Q 30/06*** | (2012.01) |

(52) U.S. Cl.
CPC ........... *G06Q 30/02* (2013.01); *G06Q 10/087* (2013.01); *G06Q 10/0875* (2013.01); *G06Q 20/203* (2013.01); *G06Q 20/209* (2013.01); *G06Q 30/0601* (2013.01)

(58) Field of Classification Search
USPC ................... 719/315, 320; 717/120; 709/203
See application file for complete search history.

(56) References Cited

U.S. PATENT DOCUMENTS

| | | | | |
|---|---|---|---|---|
| 6,035,321 | A * | 3/2000 | Mays | G06F 9/4425 712/E9.082 |
| 6,418,447 | B1 * | 7/2002 | Frey | G06F 17/30607 |
| 6,594,671 | B1 * | 7/2003 | Aman | G06F 9/465 |
| 7,213,049 | B2 * | 5/2007 | Felt et al. | 709/203 |
| 7,331,035 | B2 * | 2/2008 | Loos et al. | 717/104 |
| 7,493,622 | B2 * | 2/2009 | Borkan | G06F 11/3476 717/130 |

(Continued)

OTHER PUBLICATIONS

Monson-Haefel, Enterprise JavaBeans, O'Reilly & Associates, Inc., 2000, pp. 364-369.*

(Continued)

*Primary Examiner* — Diem Cao
(74) *Attorney, Agent, or Firm* — Steven M. Greenberg, Esq.; CRGO Law

(57) ABSTRACT

A method provides real world contexts to computer applications for outputting data describing one or more real world contexts. Components are identified in a computer application which implement instances of real world contexts and application components are updated so that a real world context instance is active during the execution by the application of a function for the real world context instance. Each real world context instance may have an instance identifier and is referenced by type of real world context.

15 Claims, 4 Drawing Sheets

(56) References Cited

U.S. PATENT DOCUMENTS

| | | | | |
|---|---|---|---|---|
| 7,783,720 | B1 * | 8/2010 | Allavarpu ............... | G06F 9/541 709/203 |
| 2003/0090514 | A1 * | 5/2003 | Cole et al. .................... | 345/744 |
| 2003/0177170 | A1 * | 9/2003 | Glass ...................... | G06F 9/465 709/203 |
| 2003/0177182 | A1 * | 9/2003 | Clark .................... | G06F 9/5033 709/203 |
| 2004/0111730 | A1 * | 6/2004 | Apte ....................... | G06F 9/548 719/330 |
| 2008/0307392 | A1 * | 12/2008 | Racca et al. .................. | 717/120 |

OTHER PUBLICATIONS

Rob et al, Course Technology, a Division of International Thomson Publishing, 1997, 6 pages.*
Raj, Enterprise JavaBeans—Part 8, Dec. 1998, 11 pages.*

* cited by examiner

PROVIDING REAL WORLD CONTEXTS TO COMPUTER APPLICATIONS

BACKGROUND OF THE INVENTION

This invention relates to computer applications, and more particularly, to providing real world contexts for applications in a computer system.

The term "real world" is used herein to describe non-computer based contexts. A real world view of a process may be, for example, related to a business context. Real world context instances describe something that has occurred which is of interest in the real world context. For example, a business context instance may describe an occurrence which is of interest to the business such as a new customer order arriving, an invoice being paid, or a complaint being received from a customer. Real world contexts may also include scientific experimental contexts, teaching or training related contexts, and other non-commerce related contexts.

Real world context instances do not refer to computer or information technology infrastructure. They are also not instances that necessarily reflect errors in the computer system. They are therefore not the same as more traditional "system events" which describe events that are going on in the computer infrastructure and are used by computer or IT professionals.

Business models use terms that are familiar to business users to describe how a computer system is operating. For various reasons, such as performance and reliability, computer systems rarely provide a straightforward implementation of these business models. For example, a single customer order may appear in a business model as a document passing between departments. However, in the computer system, it may begin as a JMS (Java™ Message Service, Java is a trade mark of Sun Microsystems, Inc. in the United States, other countries or both) or IBM® WebSphere® MQ (IBM and WebSphere are trademarks of International Business Machines Corporation in the United States, other countries or both) message, morph into a BPEL (Business Process Execution Language) process and end up as a number of database records dispersed throughout the computer system.

Over time, the connection between the application and the business model is lost, making it difficult to relate between the real world and the processing of the computer system. This affects the quality of user messages and other information generated by the computer system. It also makes it harder to understand the significance of failures in the computer system to the business.

Often a collection of records of business instances is needed to analyze a particular aspect of a business such as a historical trend or a statistical average. These records may be written over a period of time and consequently are interleaved with other, unrelated, records in the data stores.

The most efficient way to retrieve a collection of related business records is to classify them appropriately as they are written to the data stores. This classification is recorded in a particular field in each record. For example, if records contained a field for the day of the week that the record was written ("Sunday", "Monday", "Tuesday", "Wednesday", "Thursday", "Friday" or "Saturday") it would be simple to retrieve all records generated on, say, any Monday.

However, it is unlikely that any one classification scheme will satisfy the information needs of all users. For example, one person may need to view records describing the activities of a particular user while another person may wish to view the history of all updates made to a particular object during a particular day, irrespective of who made the update.

BRIEF SUMMARY OF THE INVENTION

According to one aspect of the present invention, a method provides real world contexts to computer applications for outputting data describing one or more real world contexts. The method comprises identifying components in a computer application which implement instances of real world contexts and updating application components so that a real world context instance is active during the execution by the application of a function for the real world context instance. Each real world context instance may have an instance identifier and is referenced by type of real world context.

According to another aspect of the present invention, a computer program product on a computer system for providing real world contexts to computer applications for outputting data describing one or more real world contexts comprises a computer readable medium having computer readable program code embodied therein. The computer readable program code comprises computer readable program code configured to update application components in an application so that a real world context instance is active during the execution by the application of a function for the real world context instance. Each real world context instance may have an instance identifier and is referenced by a type of real world context.

According to yet another aspect of the present invention, a system for providing real world contexts to computer applications for outputting data describing one or more real world contexts comprises means for identifying components in a computer application which implement instances of real world contexts and means for updating application components so that a real world context instance is active during the execution by the application of a function for the real world context instance. Each real world context instance may have an instance identifier and may be referenced by type of real world context.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
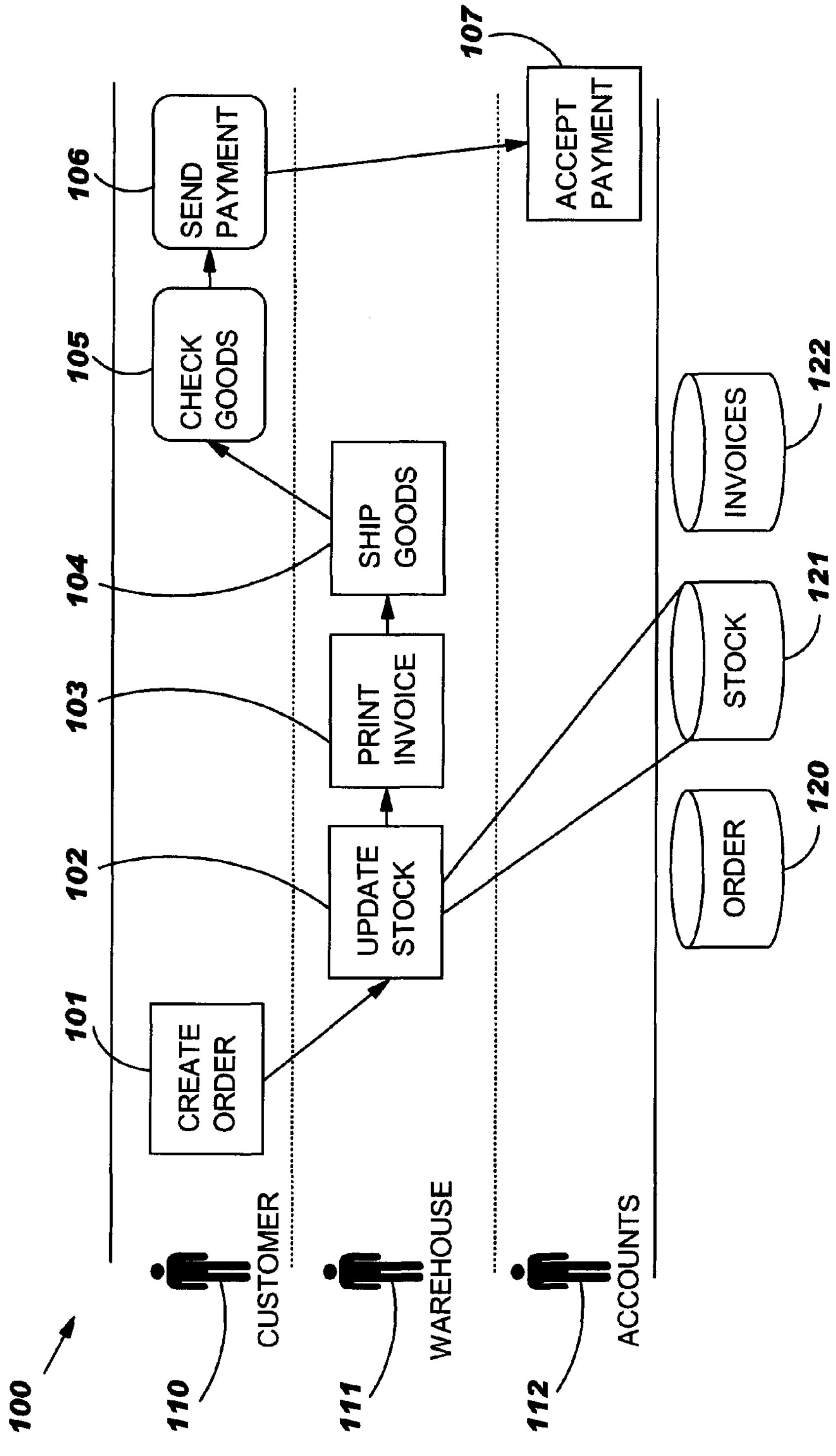
FIG. 1 is a diagram of a real world model in the form of a business model in accordance with an aspect of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Real world context instances will be described by business contexts as this illustrates the issues that business professionals have when using a computer system applied in a business environment. A conceptual mapping middleware may be provided and applied to a computer system to provide information to enable a non-computer user to know where they are in a real world model, such as a business model. Data may be added to a computer implementation to describe application data in a real world context. The data is passed around the computer system with data added as instances of real world contexts happen. The data is available describing the instance of a real world context.

An aspect of the present invention will be described in terms of a business user's model. The described business user's model has four concepts which defines types of business context instances. While the defined types of business context instances have been chosen as they appear repeatedly in the many different types of business models, it will be appreciated by those skilled in the art that other types of context instances may be chosen to suit a particular real world model.

A business solution may describe all of the processing performed by a computer system to support a significant part of the business, e.g., order processing. In an application server environment, such as IBM WebSphere Application Server, a solution may include a number of J2EE (Java 2 Platform, Enterprise Edition) applications. Solutions may share J2EE applications.

In addition, there are three more fine-grained concepts:

The business task which describes the processing to complete a small independent piece of work, e.g., the processing of a single customer order.

The business conversation which is the processing performed on behalf of a single person or business partner over a particular period, e.g., the requests made by a single warehouse worker during a single day.

The business data which describes the processing that affects a particular collection or instance of some business data, e.g., a single stock item record.

In a typical computer system, each of these concepts is implemented by one or more components. FIG. 1 is an example of a business model that shows a business process 100 which is part of an order processing solution. The overall task being performed is represented by a sequence of activities 101, 102, 103, 104, 105, 106, 107. The work of each type of user 110, 111, 112 is shown in a horizontal "swim lane." For example, the job that a warehouse worker (user 111) performs is shown in the middle lane. Along the bottom of FIG. 1 are the data objects 120, 121, 122 that are being updated.

FIG. 1 shows an update to the stock item records 121 to reflect the goods that the customer ordered. During the activity "Update Stock" 102, all four of the business concepts intersect. However, during the overall processing of the computer system, the concepts change independently of one another. At any one time there are many instances of this business process 100 executing in the computer system, involving many people performing the three roles identified 110, 111, 112.

Each business context instance may have a type (for example, business solution, business conversation, business task or business data), an instance identifier and an optional set of name-value pair properties. The business context instances may be associated with the thread so they are available to all components processing a particular request. These components may update and change them at any time.

Figure 2:
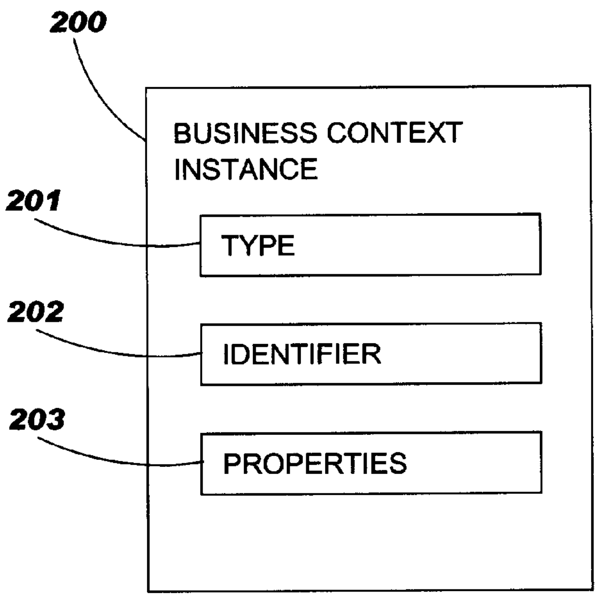
FIG. 2 is a business context instance in accordance with an aspect of the present invention.

FIG. 2 shows a business context instance 200. The business context instance has a type 201, an instance identifier 202, and optional properties 203. As an example of the benefits of the described system, each of the automated steps in the overall model may produce an event record. Each event record has identifiers of one or more context instances stored inside it, for example, an event record may have identifiers of a solution context instance, a task context instance, a conversation context instance and a data context instance. Information about different aspects of a business process can then be queried as follows:

The event records that relate to the processing of an individual order would be classified by the task context identifier.

The event records relating to all of the processes that an individual warehouse worker has been involved with would be classified by the conversation context identifier.

The orders that requested a particular item of stock would be classified by the data context identifier.

Since the business contexts represent concepts in the business model, it may be desirable to record details about them. Each instance of a business context may, optionally, have a description in the form of a set of properties written to the data stores. This can be written at any time. The business context description identifies the component it is associated with (if any) and its relationship to the business model. The identifier of the business context description is the same as the business context instance's unique Identifier.

An aspect of the present invention will be described with respect to an application on IBM WebSphere Application Server:

1. Work through the business model, or high-level design, and identify the key concepts that are relevant to the application's users. In particular, identify the key user roles, the business tasks that the computer system performs and the key data entities that the business owns. The example shown in FIG. 1 has the following business concepts: Customer, Warehouse Worker, Accounts Clerk, Fulfil Order Process, Order, Stock, Invoices.

2. Group the business concepts into related types. These groupings will form the basis of the business context types. The business context types may be, for example, the types of solution, task, conversation and data described above in relation to FIG. 1, or alternatively, they may be other defined types.

| User roles/ conversations | Business Tasks | Business Entities/Data |
|---|---|---|
| Customer | Fulfil Order Process | Order |

-continued

| User roles/ conversations | Business Tasks | Business Entities/Data |
|---|---|---|
| Warehouse Worker | | Stock |
| Accounts Clerk | | Invoices |

3. For each business concept, decide on what the life span of an instance is and how each instance is identified. For example, if there is a business task to "fulfil an order" then there could be a new business task context instance for every order. The order identifier could be the context instance identifier.

4. Review the design of the WebSphere Application Server application(s) to identify which component (or method on a component) implements each of the business concepts identified. Typically, servlets, JSPs (Java Service Pages) and portlets represent the user roles, session beans and/or BPEL processes represent the business tasks and entity beans represent business entities.

5. Use either the Java programming interface or a deployment descriptor form to update the application components so that a context instance is active while the application executes the function for an instance of a business concept.

Figure 3:
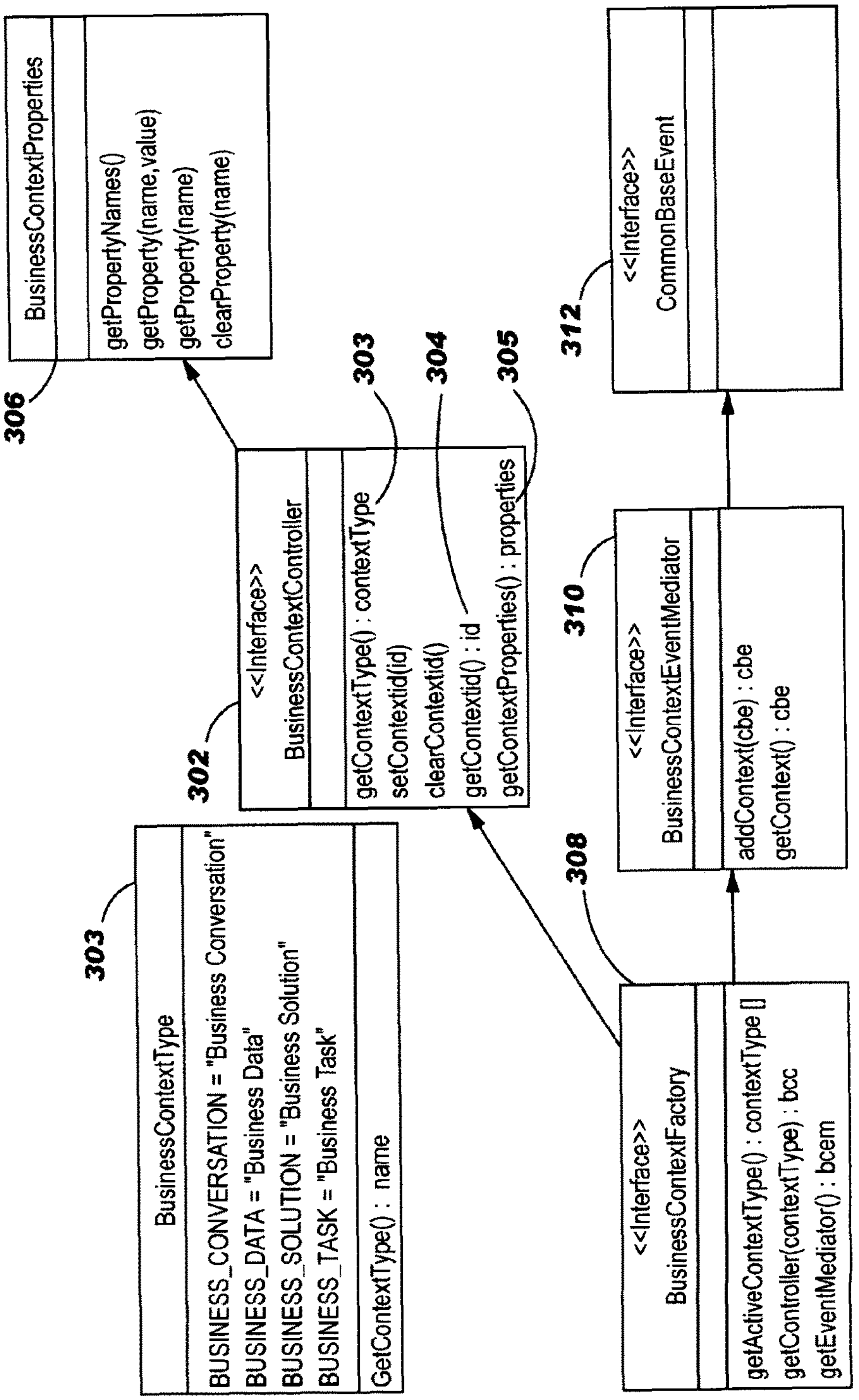
FIG. 3 is a class diagram in accordance with an aspect of the present invention.

FIG. 3 is a simplified class diagram showing a java programming API for a service in accordance with an aspect of the present invention. An object in the form of a controller interface 302 referred to as the BusinessContextController. This controller interface 302 manages the data for a single business context type 303 and its association with the current thread. This includes the instance identifier 304 and a collection of properties 305 held in a BusinessContextProperties object 306. An interface 308 referred to as the BusinessContextFactory creates a BusinessContextController object 302. The BusinessContextFactory 308 can also return the types 303 of business contexts active on the thread and create an event mediator 310 capable of adding details of the active business contexts to a Common Base Event 312.

The Event Infrastructure of WebSphere Messaging Service provides the ability to record significant events that happen in the processing of business requests. Provided a WebSphere event factory is used, the event infrastructure automatically copies the business contexts associated with the current thread into each event it creates. The code snippet below shows how to extract the BusinessContextController 302 for a business task from the current thread and then add some properties to it:

```
import com.ibm.websphere.bcds.*;
import javax.naming.Context;
String factoryName="java:comp/websphere/bcds/factory";
String contextType=BusinessContextType.BUSINESS_
  TASK.getContextType( );
Context ctx=new InitialContext( );
BusinessContextFactory factory=BusinessContextFactory)
  ctx.lookup(factoryName);
BusinessContextController bcc=factory.getController(con-
  textType);
BusinessContextProperties properties=bcc.getproperties( );
bcc.setContextId("NewOrder-O56232030516");
properties.setProperty("customerNo, "C03738927");
properties.setProperty("orderNo", "O56232-2003-May");
properties.setProperty("orderValue", "1394000");
```

This is how to clear an instance of a business context from the thread bcc.clearContextId( ). The thread maintains a stack of context instances for each context type. Consequently, when clearContextId( ) is called, it restores the context instance for this context type that was on the thread when setContextId( ) was called.

Business contexts are controlled through extended deployment descriptors in an application server. In the described aspect, the server is a WebSphere Application Server. The deployment descriptors can associate an instance of a business context with a HTTP (HyperText Transfer Protocol) request, a HTTP session, a method on an Enterprise JavaBean (EJB) or the entire lifecycle of an entity bean.

Figure 4:
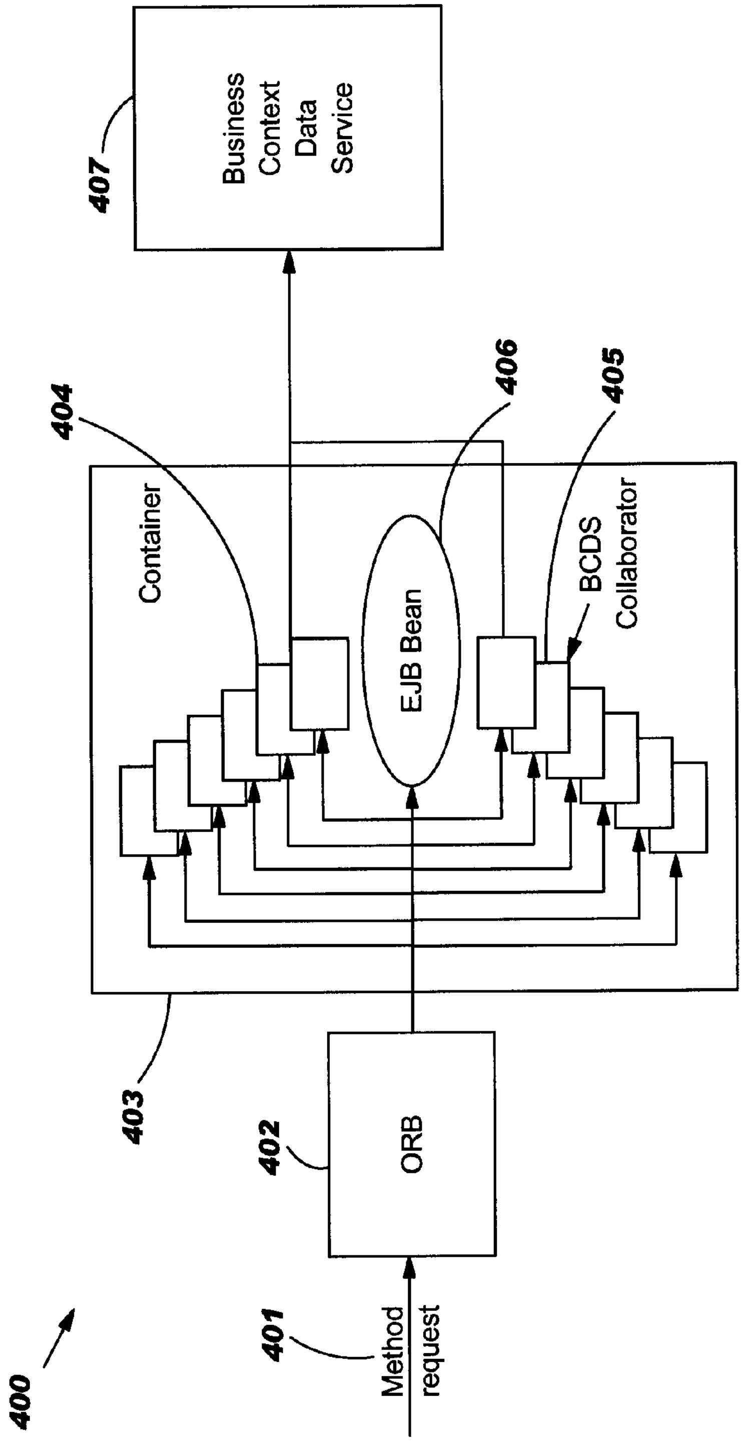
FIG. 4 is a block diagram in accordance with an aspect of the present invention.

FIG. 4 shows a method request 401 on an EJB 405. An Object Request Broker (ORB) 402 receives a request from a method 401 which is passed to an EJB container 403. The container 403 identifies the type of object request and calls the pre-invocation collaborators that are registered for that object. If the Business Context Data Service (BCDS) collaborator 404 is registered, the Business Context Data Service 407 is called, and establishes the business context on the thread. Once the EJB method 406 has completed, the post-invocation collaborator 405 is called to remove the context. It is also possible to create events with the context instance identifiers specified explicitly on the call rather than relying on the context being associated with the thread.

The application can control the values used as context identifiers. This means they can be based on values from the application data, making it easier to set up the context identifiers when requests are imported from outside the WebSphere environment.

The example below shows the extended deployment descriptor for controlling business contexts. It is associated with an EJB method and indicates that the method represents the scope of a business context. A new instance of the business context is started each time the method is called.

```
<businessContextData contextType="BusinessTask"
method="createOrder">
  <contextId  fixedValue="ORDER"
              parameter="orderNumber"
              timestamp="no"
              delimiter=":"/>
  <contextProperty  name="usageScenario"
  fixedValue="NewOrder-v1.34"/>
  <contextProperty  name="customerNo"
  parameter="customerNumber"/>
</businessContextData>
```

When the method returns, the context is cleared from the thread.

The attributes and elements are as follows:

businessContextData—This is the outer element for the deployment descriptor. It has the following mandatory attributes:

contextType—This is a mandatory attribute and has a string value. This identifies the type of the business context.

method—This is a mandatory attribute and has a string value. This identifies the method name that the context is to be attached to.

The following are optional elements:

contextId—There may be between 0-1 occurrences of this element. It has the following optional attributes that define how the contextId value is built up: fixedValue, parameter, timestamp and delimiter. The timestamp is used if the contextId element is omitted.

fixedValue—This is an optional attribute that specifies a fixed string value.

parameter—This is an optional attribute that specifies that the string value from this method parameter should be used as one of the values for the element.

timestamp—This is an optional attribute that specifies that the current time should be included in the contextId. The default-value of timestamp="no" is used if this attribute is omitted.

delimiter—This is an optional attribute that specifies a character that is used to separate the values specified in the other attributes. No delimiter is used if this attribute is omitted.

contextProperty—There may be 0-n occurances of this element. It has the following attributes:

name—This is a mandatory attribute that defines the name of the property.

fixedValue—This is an optional attribute that specifies a fixed string value.

parameter—This is an optional attribute that specifies that the string value from this method parameter should be used as the value for the element.

timestamp—This is an optional attribute that specifies that the current time should be included in the property value. The default-value of timestamp="no" is used if this attribute is omitted.

delimiter—This is an optional attribute that specifies a character that is used to separate the values specified in the other attributes. No delimiter is used if this attribute is omitted.

Each contextProperty may have a different "name" value.

The business context instances associated with the current thread are automatically transported from one WebSphere server to another as calls pass directly between EJBs. However, there is no such automatic mechanism for JMS. If a business context instance needs to pass across JMS in an application message, the active contexts and their properties are formatted into an XML document and sent as a JMS header property.

The XML below illustrates a format of an XML document used to import and export business contexts from a WebSphere server. This XML is typically used to transport the business contexts over JMS in the com.ibm.websphere.bcds.BusinessContexts property.

```
<WebSphereBusinessContexts>
  <context typeName="businessSolution" id="Order Processing"/>
  <context typeName="businessConversation" id="JGB-030516">
    <property name="startTime" value="09:00"/>
    <property name="operator" value="Joe G Bloggs"/>
  </context>
  <context typeName="businessTask" id="NewOrder-O56232030516">
    <property name="customerNo" value="C03738927"/>
    <property name="orderNo" values="O56232-2003-May"/>
    <property name="orderValue" value="1394000"/>
  </context>
<context typeName="businessData" id="Invoice-134252-030516">
    <property name="creationTime"
value="2003-05-09T14:41:45.921000-05:00"/>
  </context>
```

</WebSphereBusinessContext>

Business context data relates the processing of the application to the business it is supporting. Consequently, applications are better placed to output diagnostics, events and messages that make sense to the business user.

The present invention may be implemented as a computer program product, comprising a set of program instructions for controlling a computer or similar device. These instructions can be supplied preloaded into a system or recorded on a storage medium such as a CD-ROM, or made available for down loading over a network such as the Internet or a mobile telephone network.

The described method and apparatus is concerned with the composition of individual manageable resources into solutions, and how the runtime solutions can be managed. However, the same concepts could be applied at any level of the stack where an aggregate or group resource is composed of multiple individual resources for the purposes of management. For example, for managing server clusters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for business context oriented request processing, the method comprising:

establishing a stack of business context instances in a thread, each for a context type;

receiving an object request for an object in an object request broker (ORB);

passing the request from the ORB to an enterprise Java bean (EJB) container, the EJB container identifying a type of the object request, determining if a business context data service collaborator is registered for the object and calling the business context data service, the business context data service establishing a business context instance in the stack on the thread for the object; and, upon the EJB completing processing of the object request, calling by the EJB container a post-invocation collaborator to remove one of the context instances corresponding to the type from stack in the thread by clearing in the thread a context identifier for the business context instance and restoring the business context instance corresponding to the context identifier.

2. The method of claim 1, further comprising creating an event with a specific context instance identifier specified explicitly in the call to the business context data service rather than relying upon the business context established for the thread.

3. The method of claim 1, further comprising transporting the business context instance of the thread from one application server to another.

4. The method of claim 3, further comprising:

determining if the business context is directed to be transported across a Java messaging service (JMS) in an application message; and, on condition that the business context is directed to be transported across a JMS in an application message, formatting the business context and corresponding properties into an extensible markup language (XML) document and transporting the formatted business context as a JMS header property in an application message.

5. The method of claim 1, wherein the business context comprises any of a solution context, a task context, a role context and a data context.

6. A non-transitory computer readable storage medium having computer readable instructions stored therein for business context oriented request processing, the computer readable instructions, which, when executed on a computer system, cause the computer system to perform the operations comprising:

establishing a stack of business context instances in a thread, each for a context type;

receiving an object request for an object in an object request broker (ORB);

passing the request from the ORB to an enterprise Java bean (EJB) container, the EJB container identifying a type of the object request, determining if a business context data service collaborator is registered for the object and calling the business context data service, the business context data service establishing a business context instance in the stack on the thread for the object; and, upon the EJB completing processing of the object request, calling by the EJB container a post-invocation collaborator to remove one of the context instances corresponding to the type from the stack on the thread by clearing in the thread a context identifier for the business context instance and restoring the business context instance corresponding to the context identifier.

7. The computer readable storage medium of claim 6, further comprising creating an event with a specific context instance identifier specified explicitly in the call to the business context data service rather than relying upon the business context established for the thread.

8. The computer readable storage medium of claim 6, further comprising transporting the business context instance of the thread from one application server to another.

9. The computer readable storage medium of claim 8, further comprising:

determining if the business context is directed to be transported across a Java messaging service (JMS) in an application message; and, on condition that the business context is directed to be transported across a JMS in an application message, formatting the business context and corresponding properties into an extensible markup language (XML) document and transporting the formatted business context as a JMS header property in an application message.

10. The computer readable storage medium of claim 6, wherein the business context comprises any of a solution context, a task context, a role context and a data context.

11. A computer hardware system for business context oriented request processing, the system comprising:

a processor;

a module, running on the processor, configured for establishing a stack of business context instances in a thread, each for a context type;

receiving an object request for an object in an object request broker (ORB);

passing the request from the ORB to an enterprise Java bean (EJB) container, the EJB container identifying a type of the object request, determining if a business context data service collaborator is registered for the object and calling the business context data service, the business context data service establishing a business context instance in the stack on the thread for the object; and, upon the EJB completing processing of the object request, calling by the EJB container a post-invocation collaborator to remove one of the context instances corresponding to the type from the stack on the thread by clearing in the thread a context identifier for the business context instance and restoring the business context instance corresponding to the context identifier.

12. The system of claim 11, wherein the module is further configured for creating an event with a specific context instance identifier specified explicitly in the call to the business context data service rather than relying upon the business context established for the thread.

13. The system of claim 11, wherein the module is further configured for transporting the business context instance of the thread from one application server to another.

14. The system of claim 13, wherein the module is further configured for:

determining if the business context is directed to be transported across a Java messaging service (JMS) in an application message; and, on condition that the business context is directed to be transported across a JMS in an application message, formatting the business context and corresponding properties into an extensible markup language (XML) document and transporting the formatted business context as a JMS header property in an application message.

15. The system of claim 11, wherein the business context comprises any of a solution context, a task context, a role context and a data context.

* * * * *